(12) United States Patent
Foisy et al.

(10) Patent No.: US 10,198,934 B2
(45) Date of Patent: Feb. 5, 2019

(54) FACSIMILE AWARE ALARM MONITORING STATION AND METHOD

(75) Inventors: Stephane Foisy, Udora (CA); Pavel Raikhlin, Thornhill (CA)

(73) Assignee: Tyco Safety Products Canada Ltd., Concord, Ontario (CA)

(*) Notice: Subject to any disclaimer, the term of this patent is extended or adjusted under 35 U.S.C. 154(b) by 0 days.

(21) Appl. No.: 13/145,585

(22) PCT Filed: Jan. 22, 2010

(86) PCT No.: PCT/CA2010/000091
§ 371 (c)(1),
(2), (4) Date: Jul. 21, 2011

(87) PCT Pub. No.: WO2010/083603
PCT Pub. Date: Jul. 29, 2010

(65) Prior Publication Data
US 2011/0286590 A1    Nov. 24, 2011

Related U.S. Application Data

(60) Provisional application No. 61/146,727, filed on Jan. 23, 2009.

(51) Int. Cl.
*H04M 11/00* (2006.01)
*G08B 29/06* (2006.01)
(Continued)

(52) U.S. Cl.
CPC .............. *G08B 29/06* (2013.01); *G08B 25/08* (2013.01); *G08B 29/185* (2013.01);
(Continued)

(58) Field of Classification Search
USPC .................................................... 379/37–50
See application file for complete search history.

(56) References Cited

U.S. PATENT DOCUMENTS 4,993,059 A * 2/1991 Smith ................... H04M 11/04
                                                        379/39
5,093,856 A * 3/1992 Atkinson et al. .......... 379/93.02
(Continued)

FOREIGN PATENT DOCUMENTS

WO    WO 98/21879    5/1998
WO    2010096932 A1   9/2010

OTHER PUBLICATIONS

European Patent Office, Supplementary European Search Report, dated Aug. 6, 2012, for European Patent Application No. 10733178.7, filed on Jan. 22, 2010 (6 Pgs.).
(Continued)

*Primary Examiner* — Duc Nguyen
*Assistant Examiner* — Assad Mohammed (57) ABSTRACT

A method and security system arrangement are disclosed for processing incoming signals at an alarm monitoring station. The method includes analyzing the incoming signals to assess if any particular incoming signal includes characteristics of a facsimile signal to thereby identify whether or not a given incoming signal is a facsimile signal. If the analyzing identifies that a given incoming signal includes characteristics of a facsimile signal, thus identifying that the given incoming signal is likely a facsimile signal, the alarm monitoring station refrains from initiating an alarm handling procedure to handle the given incoming signal. Caller ID information may be extracted from the facsimile signals received by the alarm monitoring station, and added to a call block list. Calls originating from caller IDs on the call block list may be blocked by the alarm monitoring station.

14 Claims, 3 Drawing Sheets

(51) Int. Cl.
*G08B 25/08* (2006.01)
*G08B 29/18* (2006.01)
*H04M 1/663* (2006.01)
*H04M 11/04* (2006.01)
*H04M 11/06* (2006.01)

(52) U.S. Cl.
CPC ............ *H04M 1/663* (2013.01); *H04M 11/04* (2013.01); *H04M 11/066* (2013.01); *H04M 2203/2066* (2013.01)

(56) References Cited

U.S. PATENT DOCUMENTS

| | | | | |
|---|---|---|---|---|
| 5,499,287 | A * | 3/1996 | Beck | H04M 1/82 379/100.01 |
| 6,108,405 | A * | 8/2000 | Luong | H04N 1/32704 379/100.15 |
| 6,442,249 | B1 | 8/2002 | Miller, Jr. | |
| 6,647,099 | B1 * | 11/2003 | Durkin | H04L 12/2854 379/93.02 |
| 6,721,059 | B1 * | 4/2004 | Sturgeon | H04N 1/32005 358/1.15 |
| 6,829,478 | B1 | 12/2004 | Layton et al. | |
| 6,856,607 | B1 * | 2/2005 | Vialle | H04B 17/327 370/318 |
| 7,006,612 | B1 * | 2/2006 | Stroud | H04M 11/06 379/100.01 |
| 7,009,510 | B1 | 7/2006 | Douglass et al. | |
| 8,325,711 | B2 * | 12/2012 | Abraham | 370/352 |
| 2001/0012343 | A1 | 8/2001 | Dal Molin | |
| 2002/0080730 | A1 * | 6/2002 | LeBlanc | 370/286 |
| 2002/0191226 | A1 * | 12/2002 | Huang | H04N 1/32005 358/440 |
| 2006/0002524 | A1 * | 1/2006 | Bettis et al. | 379/88.22 |
| 2006/0232399 | A1 * | 10/2006 | Martin | 340/539.16 |
| 2006/0293100 | A1 | 12/2006 | Walter | |
| 2007/0057784 | A1 * | 3/2007 | Govindaraj | G08B 26/008 340/541 |
| 2007/0201462 | A1 * | 8/2007 | Ilan | H04L 47/10 370/389 |
| 2009/0002149 | A1 * | 1/2009 | McKelvey | H04M 11/04 340/531 |
| 2009/0059918 | A1 * | 3/2009 | Spade et al. | 370/389 |

OTHER PUBLICATIONS

European Patent Office, Communication, dated Mar. 8, 2013 in related European Patent Application No. 10733178.7, filed Jan. 22, 2010.
International Search Report dated May 7, 2010 for PCT Patent application No. PCT/CA2010/00091 filed Jan. 22, 2010.
Written Opinion dated May 7, 2010 for PCT Patent application No. PCT/CA2010/00091 filed Jan. 22, 2010.
Jevtic, Nenad, "CIPO Communication" dated Feb. 29, 2016, in Canadian Patent Application No. 2,750,066.
Jevtic, Nenad, "CIPO Communication" dated Jan. 11, 2017, in Canadian Patent Application No. 2,750,066.
Jevtic, Nenad, "CIPO Communication" dated Dec. 1, 2017, in Canadian Patent Application No. 2,750,066.

* cited by examiner

FACSIMILE AWARE ALARM MONITORING STATION AND METHOD

CROSS-REFERENCE TO RELATED APPLICATIONS

This application is a national filing of International Application No. PCT/CA2010/000091 filed Jan. 22, 2010, entitled "FACSIMILE AWARE ALARM MONITORING STATION AND METHOD", which claims benefits from U.S. Provisional Patent Application No. 61/146,727 filed Jan. 23, 2009, the contents of which are hereby incorporated herein by reference.

FIELD OF THE INVENTION

The present invention relates generally to security systems, and more particularly to distinguishing between alarm signals and facsimile signals received at an alarm monitoring station.

BACKGROUND OF THE INVENTION

It is common for businesses and homeowners to have a security system for detecting alarm conditions at their premises and reporting these to a monitoring station. One of the primary functions of the monitoring station is to notify a human operator when one or more alarm conditions have been sensed by detectors installed at a monitored premise.

Detectors may vary from relatively simple hard-wired detectors, such as door or window contacts to more sophisticated battery operated ones such as motion and glass break detectors. The detectors may all report to an alarm control panel at the premises. The control panel is typically installed in a safe location and is connected to a power supply. The control panel is further in communication with the individual detectors to communicate with or receive signals from individual detectors. The communication between the alarm control panel and the detectors can be one or two way, and may be wired or wireless.

Upon being notified of a detected alarm condition, the control panel typically places a phone call to a monitoring station whose telephone number has been pre-programmed into the panel. At the monitoring station, the call is received by a complementary interface. Thereafter, the panel notifies the interface at the monitoring station using a protocol understood by both the panel and monitoring station.

As the telephone number (or numbers) of the monitoring station is (or are) publically accessible, accidental facsimile transmission may periodically be made to the monitoring station. Transmission of the facsimile may stop quickly if the sender realizes the mistake, or may not stop if the sending facsimile machine is left unattended. In the latter case, the facsimile machine may flag a communication failure and may attempt to re-send the facsimile, thus tying up resources of the monitoring station. For example, the facsimile machine may continue to call the monitoring station and may tie up several lines.

Presently, upon receiving a call carrying a signal of unrecognizable form, monitoring stations simply produce either a "no data" indicator or a communications data failure indicator. Both indicate that a call was received but no signal was decoded, or that the signal did not have valid data, but do not indicate why. These failure indicators may then be flagged to operators for manual processing. For example, the automatic number identification (ANI) or caller ID (CNID) of the originating device may be decoded from the call and passed to an operator. The operator may try to call the ANI or CNID number only to receive a facsimile tone.

Accordingly, there is a need for an alarm monitoring station that better handles facsimile signals.

SUMMARY OF THE INVENTION

In a first aspect, there is provided a method of processing incoming signals at an alarm monitoring station. The method includes analyzing the incoming signals to assess if any particular incoming signal includes characteristics of a facsimile signal to thereby identify whether or not a given incoming signal is a facsimile signal, and if the analyzing identifies that a given incoming signal includes characteristics of a facsimile signal, refraining from initiating an alarm handling procedure to handle the given incoming signal.

In a second aspect, there is provided a security system arrangement. The security system arrangement includes a communication network, an alarm transmitter at a monitored premise for sending an alarm signal over the communication network and a central monitoring station. The central monitoring station includes a network interface module in communication with the communication network for receiving incoming signals. The central monitoring station further includes a facsimile tone detection module operable to analyze the incoming signals to assess if any particular incoming signal includes characteristics of a facsimile signal to thereby identify whether or not a given incoming signal is a facsimile signal; and in response to the analyzing identifying that a given incoming signal includes characteristics of a facsimile signal, refrain from initiating an alarm handling procedure to handle the given incoming signal.

In a third aspect, there is provided a method a method of processing incoming signals at an alarm monitoring station. The method includes analyzing the incoming signals to assess if any particular incoming signal includes characteristics of a given signal type, the given signal type having a characteristic fingerprint, to thereby identify whether or not a given incoming signal is of said given signal type, and if the analyzing identifies that a given incoming signal includes characteristics of the given signal type, refraining from initiating an alarm handling procedure to handle the given incoming signal.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
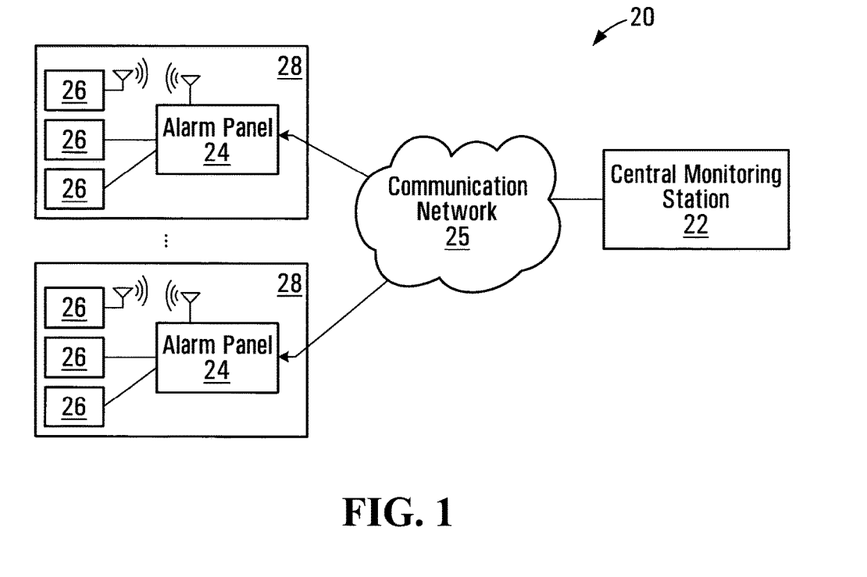
FIG. 1 is a schematic diagram of an alarm system, exemplary of an embodiment of the present invention.

FIG. 1 depicts an exemplary security system infrastructure 20 of security systems including multiple alarm panels 24 at customer premises, communicating through a network 25 such as the cellular telephone network or public switched telephone network (PSTN), with a central monitoring station 22.

Typically, alarm panels 24 are installed at residential or business premises 18 (hereinafter, individually monitored premise(s) 18). Each alarm panel 24 may be interconnected with one or more detectors 26, each detector provides information regarding the status of the monitored space to panel 24. Detectors 26 may include, for example, motion detectors, glass break detectors, and contact switches. Detectors 26 may be hard wired to alarm panel 24 or may communicate with alarm panel 24 wirelessly, in manners known to persons of ordinary skill. Alarm panel 24 may further include other interfaces such as key pads, sirens, and the like, not specifically shown in FIG. 1.

A typical alarm panel 24 includes a processor; memory in communication with the processor, storing program instructions and configuration data for the processor/alarm panel 24; a detector interface for communication with detectors 26; and a network interface for communication with communication network 25. Example alarm panels include Digital Security Controls models PC1864 and PC9155.

Alarm panel 24 operates in a conventional manner. Program instructions stored in memory, along with configuration data may control overall operation of panel 24. In particular, a number of different PSTN telephone numbers may be stored in memory of alarm panel 24. These telephone numbers may include the telephone number of a central monitoring station (e.g. "416-555-1111" for central monitoring station 22), or alternate phone numbers by which central monitoring station 22 may be reached. Moreover, alarm panel 24 may be pre-programmed by an administrator of that panel to call a specific telephone number upon detection of a sensed event by one or more of detectors 26. For example, upon detecting a sensed event, alarm panel 24 may act as a transmitter, and place a call to central monitoring station 22 by calling "416-555-1111". In addition, alarm panel 24 may be programmed to call a telephone number by which a resident/administrator of the monitored premise may be reached (e.g. a cellular phone number of the homeowner, in the case where the monitored premise is a residential dwelling).

Once a telephone connection has been established by alarm panel 24 with central monitoring station 22, alarm panel 24 may send data representative of the sensed alarm event to central monitoring station 22. Specifically, alarm panel 24 may send the data using any one of a number of communication techniques. For example, the data may be sent to the monitoring centre as a series of dual-tone, multi frequency ("DTMF") tones using, for example, the SIA Protocol (as specified in the ANSI SIA DC-03-1990.01 Standard, the contents of which are hereby incorporated by reference), the ContactID Protocol, or as modulated data, modulated as pulses, or on a carrier frequency (generally, "alarm communication signal protocols").

Central monitoring station 22 is depicted as a single monitoring station in FIG. 1; however, it could alternatively be formed of multiple monitoring stations, each at a different physical location, and each in communication with communication network 25. As previously explained, central monitoring station 22 may be associated with a plurality of PSTN or cellular telephone numbers by which it can be contacted by alarm panels 24 to report alarm events over network 25. Thus, it will be apparent that central monitoring station 22 may receive many calls over network 25 in addition to those from alarm panel(s) 24.

In particular, most calls received by central monitoring station 22 from alarm panels 24 may be expected to carry signals conforming to alarm communication signal protocols. However, possibly, some telephone calls received by central monitoring station 22 may be from unknown origins and/or may carry signals that do not conform to alarm communication signal protocols. In the latter instance, central monitoring station 22 may be unable to process those signals.

Figure 2:
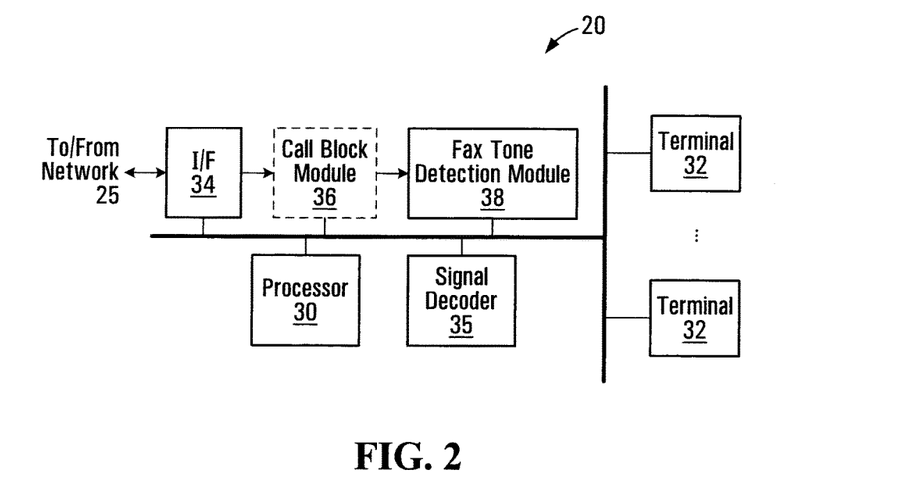
FIG. 2 is a schematic block diagram of a central monitoring station in the alarm system of FIG. 1.

FIG. 2 is a schematic block diagram of an exemplary central monitoring station 22. Specifically, central monitoring station 22 may include receiver equipment available from Sur-Gard Security products, generally referred to as the Sur-Gard System III modified to function as described herein. As depicted in FIG. 2, central monitoring station 22 may include a network interface 34, optional call block module 36 illustrated in dotted outline, signal decoder 35, facsimile tone detection module 38, processor 30 and one or more terminals 32, exemplary of an embodiment of the present invention.

Processor 30 is in communication with, and controls overall operation, of network interface 34, call block module 36, facsimile tone detection module 38, and terminal(s) 32. Processor 30 may include, or be in communication with, with memory controlling the overall operation of monitoring station 22. Network interface 34 may be a conventional network interface that interfaces with communications network 25 to receive incoming signals. Signal decoder 35 may decode incoming signals to extract data therefrom (e.g. data relating to an alarm event). Terminal(s) 32 may be computers, or the like, to which received data representative of an alarm event is passed for handling by human operators.

Conventionally, central monitoring station 22 receives and processes incoming telephone calls carrying alarm event data encoded in signals conforming to alarm communication signal protocols as follows. After establishing a connection between alarm panel 24 and network interface 34, processor 30 may send a handshake signal to alarm panel 24 by way of network interface 34. In turn, alarm panel 24 may send back an expected reply signal. As will be understood by those skilled in the art, handshaking typically involves the exchange of data between a transmitter, e.g. alarm panel 24, and a receiver, e.g. central monitoring station 22, to allow the transmitter and receiver to initiate connection and successfully further communicate. For example, data exchanged during a handshake may include an indicator of the signal protocol used by the panel to encode its outgoing data.

After a successful handshake with a sending alarm panel 24, processor 30 may continue to further receive incoming signals. Specifically, the incoming signal may be provided to signal decoder 35. Signal decoder 35 may decode the incoming signal to extract alarm event data. This alarm event data may be passed to processor 30, which, in turn, may make decisions based upon that data. In particular, processor 30 may programmed to initiate certain procedures based on type of input data.

For example, alarm event data decoded from a given incoming signal may specify that a particular detector 26 at a particular monitored premise 28 was tripped. Processor 30 may be programmed to pass this type of alarm event data to a human operator for further action. Further action may include the human operator consulting, and calling, one of a list of phone numbers associated with that particular monitored premise. For example, the list may include the telephone number of the homeowner, and the operator may call the homeowner to determine what the problem was/is.

Ultimately, the operator may dispatch a third party, such as the police or security personnel to the premises.

As may be apparent, the foregoing requires that central monitoring station 22 to be able to recognize that an incoming signal is an alarm signal, i.e., that signal decoder 35 is able to successfully decode an incoming signal. However, as previously noted, central monitoring station 22 may also receive telephone calls carrying unrecognized signals. Also as previously noted, in this instance, processor 30 may terminate the call, treat the call as a communication failure or route the call to one or more of terminals 32 for processing by a human operator.

Conveniently, some non-alarm telephone calls, in particular, facsimile calls, carry signals that exhibit certain unique characteristics. Notably, after receiving an incoming telephone call, and before sending a handshake signal, processor 30 may initiate facsimile tone detection module 38 to thereby identify whether or not a signal carried by the incoming call is a facsimile signal. Once identified as a facsimile signal, processor 30 may accordingly refrain from initiating an alarm handling procedure, such as one described above, for that call, thereby reducing the number of erroneous (i.e. non-alarm) incoming calls that are passed to human operators for handling. The call may instead be terminated, without further processing.

Figure 3:
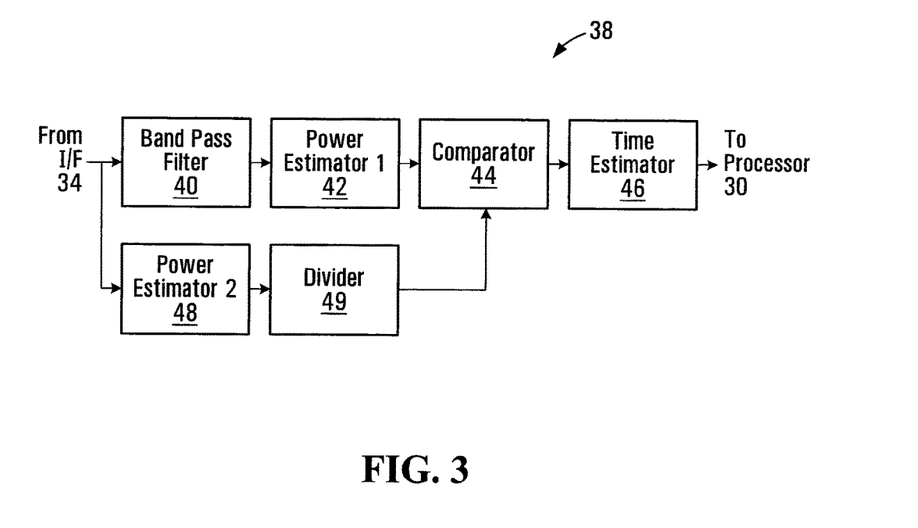
FIG. 3 is a block diagram depicting a facsimile tone detection module in the alarm system of FIG. 1, exemplary of an embodiment of the present invention.

FIG. 3 is a schematic block diagram of facsimile tone detection module 38, exemplary of an embodiment of the present invention. Facsimile tone detection module 38 may include a band pass filter 40, power estimator 42, power estimator 48, comparator 44, divider 49 and time estimator 46. Each of these components may be formed as part of a digital signal processor or the like, using conventional, electronic circuit design and fabrication techniques including integrated circuit design and fabrication techniques, large (or very large) scale integrated circuit design and fabrication techniques, application specific integrated circuit design and fabrication techniques, digital signal processor (DSP) design and fabrication techniques, or other circuit design and fabrication techniques for example analog design techniques or combinations of such techniques.

The bandwidth of band pass filter 40 may span typical expected frequencies of facsimile signals, as further discussed below. Each of power estimator 42 and power estimator 48 estimates and outputs a value indicative of the power of an input signal. Divider 49 divides an input value by a constant and output the resulting value. Comparator 44 may compare two input values, $I_1$ and $I_2$, and output a value indicating whether $I_1$ is greater than $I_2$. Time estimator 46 may output a value indicating whether an input condition holds for a pre-determined period of time.

As will be known to those of ordinary skill in the art, facsimile data may be encoded in conformance with ITU-T T.2, T.3, T.30, T.4, T.563, T.503, T.521, T.6, T.62, T.70, T.72, T.411 to T.417 standards (Group 1, Group 2, Group 3 or Group 4 facsimilees). As a result, typically, facsimile signals may be expected to be within a particular band of known frequencies around 1 kHz (hereinafter referred to as the "facsimile band"), which facsimile band is a sub-band of the entire telephony band.

Conveniently, a facsimile signal may be characterized by the presence of a high amount of signal power (or signal energy) in the facsimile band as compared to signal power (or signal energy) in the entire telephony band during handshaking. However, this characteristic may persist even after the handshake. In this document, the terms signal power and signal energy may be used interchangeably, namely, as a measure of the amount of signal. Notably, facsimile tone detection module 38 may analyze an incoming signal to assess whether or not the signal includes this characteristic. If it does, facsimile tone detection module 38 may identify the signal as a facsimile signal.

Specifically, an incoming (e.g. telephony signals) signal is input to band pass filter 40. Band pass filter 40 may be designed in a conventional manner to pass through signals whose frequencies are frequencies within the facsimile band. The output filtered signal may be input to power estimator 42. As well, the unfiltered incoming signal may be input to power estimator 48. Each of power estimators 42 and 48 may output a value indicative of the power of the filtered signal and unfiltered signal, respectively.

Since the facsimile band is a sub-band of the telephony band, the value output by power estimator 48 (i.e. the value indicative of the power of the unfiltered input signal) may be adjusted/normalized. An exemplary adjustment/normalization may be performed as follows. The value of the power of the unfiltered signal may be divided (by divider 49) by a constant, Coeff, which is equal to the ratio of the bandwidth of the telephony band to the bandwidth of the facsimile band (i.e. Coeff=(bandwidth of telephony band/bandwidth of facsimile band)).

For example, the telephony band may have a bandwidth of 3 kHz (e.g. 1 kHz-4 kHz), and the facsimile band has a bandwidth of 1 kHz. Thus, in this example, Coeff=3. Now, if P1 is a measure of the power of the filtered signal (i.e. the power of the incoming signal in the facsimile band) and P2 is a measure of the power of the unfiltered signal (i.e. the power of the incoming signal in the entire telephony band), then it may be expected that on average, and in the absence of a facsimile signal, the incoming signal would have a power of (P2)/3 per 1 kHz band. Thus, if the signal in the facsimile band has characteristics that are similar to, or the same as the signal in the remainder of the telephony band, it may further be expected, that on average, the power of any signal in the 1 kHz facsimile band should be (P2)/3. Therefore, if P1 as measured, is greater than the expected average power of the signal in the facsimile band, (P2)/3, this may indicate that the incoming signal is a facsimile signal. In other words, the presence of a greater than average amount of signal power in the facsimile band, based on power of the signal in the entire telephony band, may be an indicator that the signal is a facsimile signal.

Comparator 44 may compare the value output by power estimator 42 (i.e. a value indicative of signal power in the facsimile band) to the value output by divider 49 (i.e. the normalized power of the unfiltered incoming signal). For example, let $I_1$ (i.e., input 1 to comparator 44) be the output from power estimator 42 (i.e. power of the filtered signal P1) and $I_2$ (i.e., input 2 to comparator 44) be the output from divider 49 (i.e. normalized power of the unfiltered signal, (P2)/3). Comparator 44 may output a high signal when $I_1 > I_2$, (i.e. when P1>((P2)/3)) and a low signal otherwise. Time estimator 46 may then test and output a value indicating whether the output of comparator 44 remains high for a pre-defined period of time, thus indicating that P1>((P2)/3) for that period of time. Processor 30 receives the output of time estimator 46 and may terminate the call (e.g. by terminating the connection between network interface 34 and communication network 25) when the output of time estimator 46 indicates that the signal power of the filtered signal is higher than the normalized signal power of the unfiltered signal over the pre-defined period of time.

In other words, processor 30 may terminate receipt of the incoming signal by central monitoring station 22 when facsimile tone detection module 38 identifies the signal as a facsimile signal.

In operation, and with reference to flow diagram S500 (FIG. 4), a network interface at central monitoring station 22, may receive an incoming telephone call carrying an incoming signal and may decode the signal to obtain caller ID or ANI information (S502).

Figure 4:
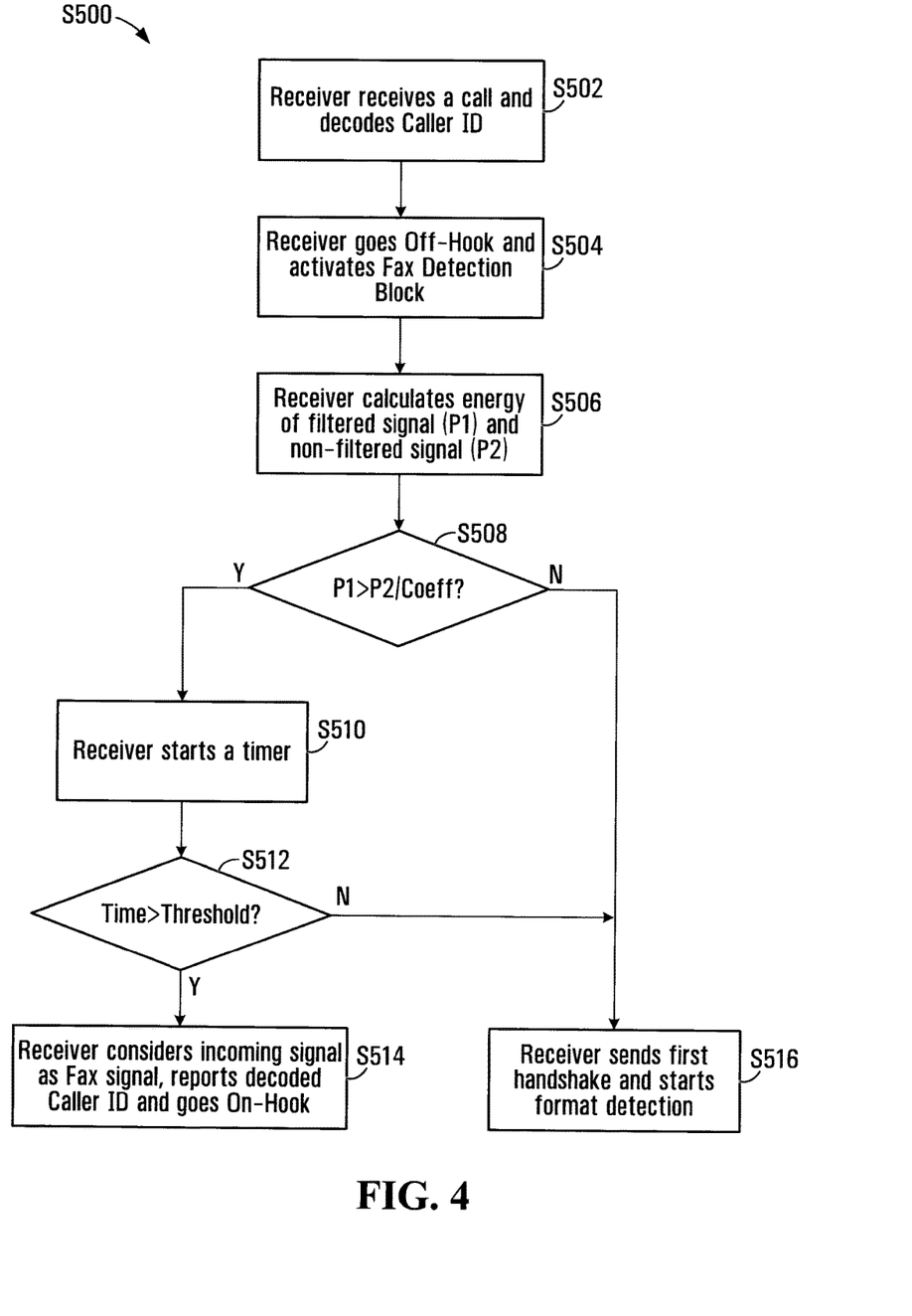
FIG. 4 is a flow diagram depicting steps performed at the central monitoring station of FIG. 2, exemplary of an embodiment of the present invention.

The call may be answered, and facsimile detection block 28 (S504) may be activate and may calculate the energy of the filtered signal P1 (i.e. the band-pass signal) and of the non-filtered signal P2 (i.e. the unfiltered signal) (S506). Next, an analysis may be carried out to assess whether P1 is greater than a normalized value of P2 (S508). If it is not, the incoming signal may be identified as not a facsimile signal, and therefore a potential alarm signal. Subsequently, a first handshake is sent to the panel transmitting the signal in the conventional manner (S516). Format detection of the incoming signal, e.g. by signal decoder 35, may also begin in the conventional manner (S516).

If, however, P1 is greater than the normalized value of P2 (S508), time estimator 46 may be triggered (S510). If P1 remains greater than the normalized value of P2 for a time greater than a pre-defined threshold, for example, of a few seconds, the incoming signal may be identified as a facsimile signal. The caller ID/ANI information, previously decoded from the signal (S502), may be reported to an operator (e.g. sent to a terminal 32) or stored by processor 30, and the call may be terminated (S514). Conveniently, in this scenario, operator time and resources may be saved by the central monitoring station 22 terminating an identified incoming facsimile call without operator involvement. Alternatively, or in addition, any data decoded from an identified facsimile signal may be sent to an operator (e.g. at terminal 32) for viewing and handling (e.g. sending a fax message back to the originating fax machine, etc Since processor 30 may store the caller ID/ANI information decoded at step S502, further post-call processing may be possible. For example, should there be several successive facsimile calls having the same caller ID/ANI information, processor 30 may place the originating caller ID/ANI on a call block list. Alternatively, the caller ID/ANI information may be sent to an operator and the operator may use his or her judgment whether to load the caller ID/ANI into the call block list. Once a caller ID/ANI is on the call block list, central monitoring station 22 may, for subsequent calls having that caller ID/ANI, hang up the line (i.e. terminate the call) without processing the signal carried by the call, as further detailed below. This may allow central monitoring station 22 to handle the next potential alarm call from any other source much more quickly than it would otherwise.

A caller ID/ANI may be removed from the list at the discretion of an operator or may be removed, for example, by processor 30, after a period of time has passed during which central monitoring station 22 has not received a call from that caller ID/ANI. Other criteria for maintaining/removing a particular caller ID/ANI on or from the call block list may of course be employed.

Specifically, call block module 36 (FIG. 2) may extract the ANI/caller ID from the incoming signal and may compare the information to ANIs/caller IDs in the call block list. Conveniently, call block module 36 may terminate a call whose ANI/caller ID indicates that the call is originating from a caller IDs/ANIs in the call block list before facsimile tone detection module 38 is even activated. This may reduce the number of incoming calls carrying signals to be analyzed by facsimile tone detection module 38.

In another embodiment, P1 may be multiplied by the ratio of the bandwidth of the telephony band to the bandwidth of the facsimile band to result in normalized power P1'·P1' may then be compared to P2.

In another embodiment, characteristics other than signal power that may be indicative of a facsimile signal may be employed, such as frequency, carrier frequency and baud rate.

In yet another embodiment of the invention, facsimile tone detection module 38 may be implemented in software (e.g. running on processor 30), rather than as digital signal processor(s) or other discrete hardware. Similarly, any component depicted in FIG. 2 may be implemented in software or as a combination of software and hardware.

While the exemplary embodiment was described with reference to facsimile signals, it may be apparent that the disclosed method and security system may be extended to other types of calls having identifiable characteristics, such as modem calls, call-progress tones, and certain voice calls capable of being recognized by voice recognition engines.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method of processing communications including incoming telephony signals at an alarm monitoring station that receives, by way of a plurality of telephone lines, messages indicative of alarm conditions from alarm systems at user premises, said method comprising:

answering each of said communications at said alarm monitoring station by way of one of said plurality of telephone lines;

extracting identifiers identifying origins of said communications;

comparing said identifiers to a facsimile call block list; and for communications whose identifiers are listed in said facsimile call block list, disconnecting the communication, without initiating an alarm handling procedure and without processing any incoming facsimile communication included in these communications;

for communications whose identifiers are not listed in said facsimile call block list:

analyzing said communications to identify a given communication as a facsimile communication or not by evaluating the signal power in the facsimile band of the given facsimile communication and comparing the signal power in the facsimile band to signal power in the telephony band of the given communication to identify a greater than expected amount of power in the facsimile band and thereby a facsimile communication; and if said analyzing identifies said given communication as said facsimile communication:

logging said extracted identifier in said facsimile call block list; and disconnecting said given communication from said alarm monitoring station without initiating an alarm handling procedure and without processing any incoming facsimile signal included in said given communication.

2. The method of claim 1 wherein said comparing comprises comparing a ratio of signal power in said facsimile band to signal power in said telephony band to a constant, whereby a ratio greater than said constant is indicative of said facsimile communication.

3. The method of claim 2 wherein said constant is a ratio of the bandwidth of said facsimile band to the bandwidth of said telephony band.

4. The method of claim 1 wherein said analyzing identifies said given communication as said facsimile communication when said given communication includes an incoming signal having characteristics of a facsimile signal over a pre-defined period of time.

5. The method of claim 1 wherein some of said communications are sent from alarm transmitters at monitored premises.

6. The method of claim 1 further comprising if said analysing identifies said given communication as an alarm communication, initiating an alarm handling procedure.

7. The method of claim 6 wherein said initiating an alarm handling procedure comprises sending a handshake signal to an alarm transmitter transmitting said given communication.

8. The method of claim 1 wherein said extracted identifier is an automatic number identification (ANI) or a caller ID (CNID).

9. The method of claim 1 wherein said communications comprise communications received over at least one of a PSTN network and a cellular network.

10. A security system arrangement comprising:
a communication network;
an alarm transmitter at a monitored premise for sending an alarm signal over said communication network;
a central monitoring station that receives, by way of a plurality of telephone lines, messages indicative of alarm conditions from alarm transmitters at user premises comprising:
a network interface module in communication with said communication network for receiving communications including incoming telephony signals and for answering each of said communications at said central monitoring station by way of one of said plurality of telephone lines;
wherein said central monitoring station further comprises:
a facsimile tone detection module, comprising:
a component for measuring signal power-in a facsimile band of incoming signals included in said communications and for measuring signal power in a telephony band of incoming signals included in said communications;
a comparator for comparing power in said facsimile band of an incoming signal included in said given communication and power in said telephony band of said incoming signal included in said given communication;
said facsimile tone detection module operable to:
analyze said communications answered at said central monitoring station by evaluating the amount of signal power in the facsimile band of the given facsimile communication to identify a given communication as either a facsimile communication or not; and
in response to said analyzing identifying that said given communication as said facsimile communication:
disconnect said given communication without initiating an alarm handling procedure and without processing to handle an any incoming facsimile signal included in said given communication;
a processor in communication with said facsimile tone detection module, said processor operable to:
receive an indication from said facsimile tone detection module that a given communication is identified as said facsimile communication;
extract or receive an identifier identifying an origin of said given communication; and
add said identifier to a facsimile call block list; and,
a call block module in communication with both said network interface module and said facsimile tone detection module, said call block module operable to:
determine an identifier of an origin of a given communication;
compare said identifier to said facsimile call block list, said facsimile call block list comprising a list of identifiers;
disconnect a given communication whose identifier is on said facsimile call block list, without initiating an alarm handling procedure and without processing any incoming facsimile communication included in the given communication; and
pass said given communication to said facsimile tone detection module for signals whose identifiers are not on said facsimile call block list.

11. The security system arrangement of claim 10 wherein said identifier is an automatic number identifier (ANI) or a caller ID (CNID).

12. The security system arrangement of claim 10 wherein said communication network is at least one of a PSTN network and a cellular network.

13. A method of processing communications including incoming telephony signals at an alarm monitoring station that receives, by way of a plurality of telephone lines, messages indicative of alarm conditions from alarm systems at user premises, said method comprising:
extracting identifiers identifying origins of said communications;
comparing said identifiers to a call block list;
for communications whose identifiers are listed in said call block list, disconnecting those communications without initiating an alarm handling procedure; and
for communications whose identifiers are not listed in said call block list:
analyzing said communications whose identifiers are not listed in said call block list to identify a given communication as either a facsimile communication or not by evaluating the signal power in the facsimile band of the given facsimile communication and comparing the signal power in the facsimile band to signal power in the telephony band of the given communication to identify a greater than expected amount of power in the facsimile band and thereby a facsimile communication;
if said analyzing identifies said given communication as said facsimile communication:
logging said extracted identifier in said call block list; and
terminating said given communication by disconnecting said given communication without initiating an alarm handling procedure and without processing any incoming facsimile signal included in said given communication; and,
if said analyzing identifies said given communication as an alarm communication initiating an alarm handling procedure to handle said incoming telephony signals included in said given communication.

14. The method of claim 2 wherein said comparing further comprises determining whether said ratio remains greater than said constant for a pre-defined period of time.

\* \* \* \* \*